(12) United States Patent
Itsui

(10) Patent No.: US 11,884,274 B2
(45) Date of Patent: Jan. 30, 2024

(54) MODE DRIVING ASSISTANCE SYSTEM FOR VEHICLE

(71) Applicant: SUBARU CORPORATION, Tokyo (JP)

(72) Inventor: Hiroshi Itsui, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 301 days.

(21) Appl. No.: 16/943,175

(22) Filed: Jul. 30, 2020

(65) Prior Publication Data
US 2021/0070298 A1 Mar. 11, 2021

(30) Foreign Application Priority Data
Sep. 11, 2019 (JP) .................. 2019-165441

(51) Int. Cl.
 *B60W 30/18* (2012.01)
 *B60W 50/14* (2020.01)
 (Continued)

(52) U.S. Cl.
 CPC .... *B60W 30/18109* (2013.01); *B60W 40/105* (2013.01); *B60W 50/14* (2013.01);
 (Continued)

(58) Field of Classification Search
 CPC ........... G05B 2219/23128; G05B 2219/23129; G05B 2219/31478; B60W 50/00;
 (Continued)

(56) References Cited

U.S. PATENT DOCUMENTS 6,157,878 A * 12/2000 Suzuki .............. G01M 17/0072
 701/33.9
2004/0040374 A1* 3/2004 Nakanishi ........... G01M 15/044
 73/116.06
(Continued)

FOREIGN PATENT DOCUMENTS

JP 200191410 A * 4/2001 ............. B60L 11/18
JP 2015-64203 A 4/2015

OTHER PUBLICATIONS

Mizutani, N., et al., "Vehicle Speed Control by a Robotic Driver Considering Time Delay and Parametric Variations," Dec. 2016, 2016 IEEE 55th Conference on Decision and Control, pp. 2437-2442 (Year: 2016).*

*Primary Examiner* — Abby Y Lin
*Assistant Examiner* — Karston G. Evans
(74) *Attorney, Agent, or Firm* — TROUTMAN PEPPER HAMILTON SANDERS LLP (57) ABSTRACT

A mode driving assistance system for a vehicle assists a driver when the driver conducts mode driving by operating an operation member such that a traveling speed meets a time series change in the traveling speed. The operation member is disposed on a chassis dynamometer. The operation member conducts at least one of acceleration or deceleration of the vehicle. The system includes: a display that the driver can observe visually; a storage that stores a target value relating to an operation amount of the operation member in time series; a first detector that detects an actual value of the operation amount of the operation member; and a controller that displays the target value of the operation amount of the operation member stored in the storage and the actual value of the operation amount of the operation member detected by the first detector, as a time series image on the display.

10 Claims, 3 Drawing Sheets

(51) Int. Cl.
  *B60W 40/105* (2012.01)
  *G01M 17/007* (2006.01)
(52) U.S. Cl.
  CPC ... *B60W 2050/146* (2013.01); *B60W 2540/10* (2013.01); *G01M 17/0074* (2013.01)
(58) Field of Classification Search
  CPC ............ B60W 50/02; B60W 50/0205; B60W 2050/021; B60W 50/0225; B60W 2050/0295; B60W 2050/0297; B60W 50/04; B60W 50/045; B60W 2050/046; B60W 50/085; B60W 30/18109; B60W 40/105; B60W 50/14; B60W 2050/146; B60W 2540/10; G01M 17/0074
  See application file for complete search history.

(56) References Cited

U.S. PATENT DOCUMENTS

| | | | | |
|---|---|---|---|---|
| 2006/0069476 | A1* | 3/2006 | Homeyer | F02D 41/2474 701/1 |
| 2012/0242513 | A1* | 9/2012 | Oguchi | G01M 17/0074 340/995.27 |
| 2013/0338957 | A1* | 12/2013 | Watanabe | G01M 17/007 702/113 |
| 2015/0084762 | A1 | 3/2015 | Okada et al. | |
| 2017/0169629 | A1* | 6/2017 | Sugihara | G01M 17/007 |

* cited by examiner

MODE DRIVING ASSISTANCE SYSTEM FOR VEHICLE

CROSS-REFERENCE TO RELATED APPLICATIONS

The present application claims priority from Japanese Patent Application No. 2019-165441 filed on Sep. 11, 2019, the entire contents of which are hereby incorporated by reference.

BACKGROUND

The disclosure relates to a mode driving assistance system for a vehicle, and particularly relates to an assistance system when a driver performs mode driving by conducting an acceleration-deceleration operation on a chassis dynamometer so as to correspond with a time series change in a traveling speed that is set in advance.

For example, fuel economy of a vehicle is calculated by conducting mode driving called a 10/15 mode, a JC08 mode, and a WLTC mode. In the driving of these modes, warm and cold states of the vehicle are set differently, however, traveling speeds of the vehicle in time series are set in advance (the traveling speed itself differs for each mode), and a driver operates an acceleration and deceleration operation member of the vehicle that is mounted on a chassis dynamometer, and causes an actual traveling speed (accurately, a rotation circumferential speed of drive wheels corresponding to the traveling speed) of the vehicle to meet the time series change in the traveling speed. The driving of these modes includes a period in which the vehicle is being stopped, so that the acceleration and deceleration operation member generally includes a brake pedal, in addition to an accelerator pedal.

In such mode driving, for example, as described in Japanese Unexamined Patent Application Publication (JP-A) No. 2015-64203, a display on which a traveling speed set in advance is displayed as a time series pattern image including dots and lines as target values of the traveling speed is used. Detected actual values of the traveling speed of the vehicle are also displayed on the display as a time series pattern image including dots and lines. Accordingly, a driver operates the acceleration and deceleration operation member of the vehicle disposed on the chassis dynamometer while visually observing the image such that the actual value of the traveling speed meets the target value set in advance of the traveling speed.

SUMMARY

An aspect of the present disclosure provides a mode driving assistance system for a vehicle. The system is capable of assisting a driver when the driver conducts mode driving by operating an operation member such that a traveling speed meets a time series change in the traveling speed that is set in advance. The operation member is disposed on a chassis dynamometer. The operation member is configured to conduct at least one of acceleration or deceleration of the vehicle. The system includes a display that the driver can observe visually, a storage, a first detector, and a controller. The storage is configured to store a target value relating to an operation amount of the operation member in time series. The target values are calculated and set in advance in order to attain the time series change in the traveling speed set in advance. The first detector is configured to detect an actual value of the operation amount of the operation member. The controller is configured to display (i) the target value of the operation amount of the operation member stored in the storage and (ii) the actual value of the operation amount of the operation member detected by the first detector, as a time series image on the display.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Proper experience is used in order to cause the traveling speed of the vehicle disposed on the chassis dynamometer to correspond with the target value, and the degree of correspondence of the traveling speed with the target value differs between a driver with less such experience and a driver with sufficient such experience. The traveling speed of the vehicle does not correspond with the target value that is defined in the mode driving to cause the fuel economy of the vehicle to be calculated to deviate from the real fuel economy. Although it is comparatively easy to cause the traveling speed of the vehicle to correspond with the target value in accordance with an actual traveling environment in such a case that the vehicle is travelling on a real road, it is difficult specially for the driver with less experience to cause the traveling speed of the vehicle to correspond with the target value simply through visual observation on the display, on the chassis dynamometer, which is a state where the traveling environment does not change and the vehicle is not actually traveling. In particular, the traveling speed of the vehicle is generated as a result of the operation of the accelerator pedal, for example, so that the inadequate operation amount deviates the subsequent traveling speed from the target value. Moreover, when the traveling speed of the vehicle is decelerated on the chassis dynamometer, it is difficult for the driver with less experience to determine whether the brake pedal is to be depressed.

The disclosure is made in view of the above problems. It is desirable to provide a mode driving assistance system for a vehicle in which even a driver with less experience easily causes a traveling speed of the vehicle to correspond with a time series change in a traveling speed that is defined in mode driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
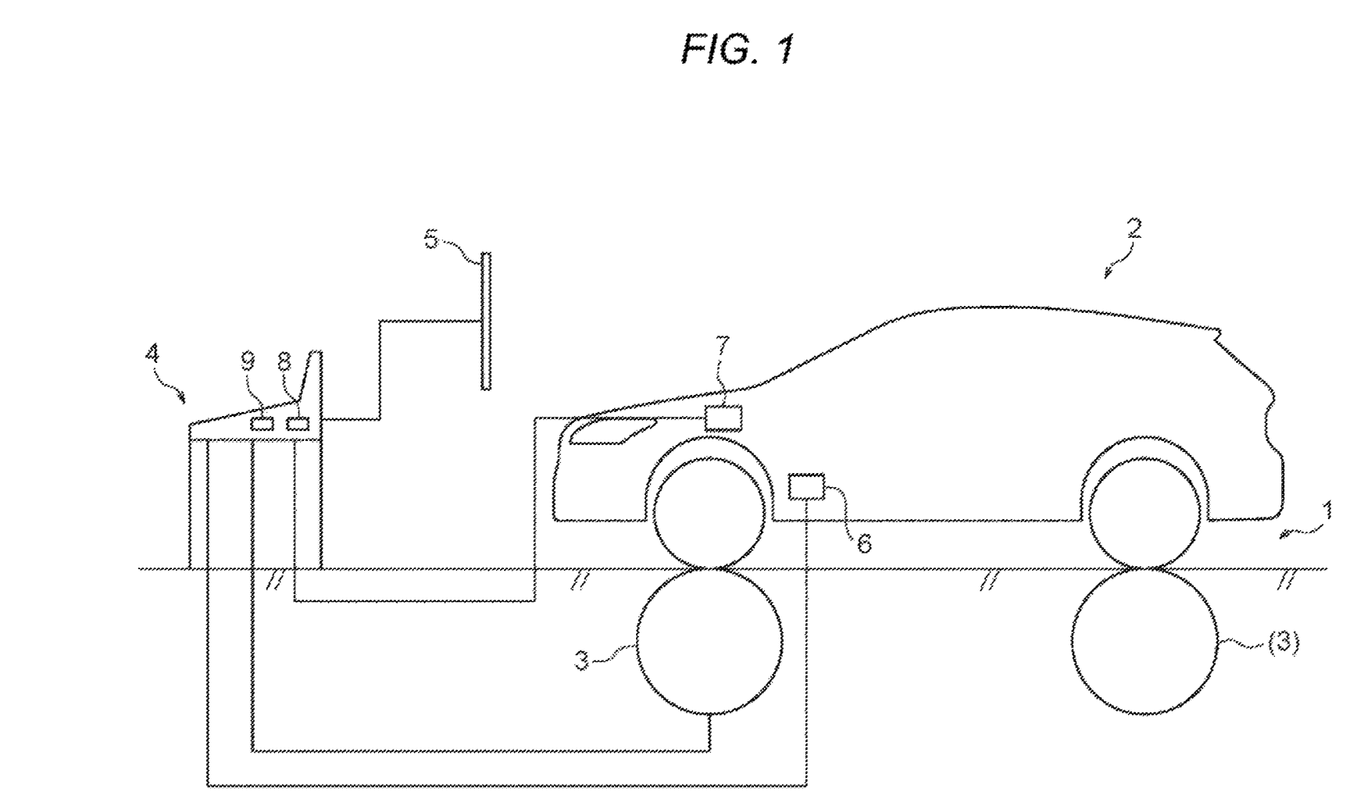
FIG. 1 is a front view illustrating a schematic configuration of a chassis dynamometer apparatus to which a mode driving assistance system for a vehicle according to an embodiment of the disclosure is applied.

FIG. 1 is a front view illustrating a schematic configuration of a chassis dynamometer apparatus to which a mode driving assistance system for a vehicle of the embodiment is applied. A chassis dynamometer of a related art is used as a chassis dynamometer 1 in the embodiment, however, the chassis dynamometer 1 may newly be constructed. In the chassis dynamometer 1, as is well known, a vehicle 2 is disposed on the chassis dynamometer 1, an electric dynamometer, which is not illustrated, is directly coupled to a rotational axis of rollers 3 on which drive wheels of the vehicle 2 are mounted, and this electric dynamometer absorbs the driving force of the drive wheels by the principle of a generator to apply a travel resistance. A load of the electric dynamometer is automatically controlled such that this travel resistance is equivalent to a resistance when the vehicle travels on an actually present road (also referred to as an actual road), that is, the sum of a rolling resistance, an air resistance, and an inertial resistance. Accordingly, a driver of the vehicle 2 disposed on the chassis dynamometer 1 adjusts a depression amount of an accelerator pedal, that is, an accelerator opening degree such that the vehicle 2 accelerates at a predetermined acceleration against the traveling resistance. Meanwhile, when the vehicle 2 decelerates, the electric dynamometer applies an inertial force that the vehicle 2 intends to continuously move mainly to the drive wheels via the rollers 3, so that the driver who drives the vehicle 2 disposed on the chassis dynamometer 1 brakes by depressing a brake pedal. A force to depress the brake pedal (called brake pedal force) is in a substantially proportional relation with a brake hydraulic pressure that acts as a wheel braking torque. It is noted that in the embodiment, as the vehicle 2 in which mode driving is conducted, a vehicle on which an engine is simply mounted as a drive source is assumed.

In the embodiment, for example, a computer system having an advanced arithmetic processing function is used as a control device 4 that causes the traveling speed (needless to say, the simulated traveling speed) of the vehicle 2 disposed on the chassis dynamometer 1 to correspond with the time series change in a traveling speed that is set in advance and that is defined in the above mode driving. Similar to the existing computer system, the computer system includes, in addition to an arithmetic processing device that performs arithmetic processing, for example, a storage device that stores therein a program and data, and an input/output device that receives input of signals from various sensors and outputs a signal to an external device such as a display, which will be described later. To the control device 4, input are the traveling speed of the vehicle 2 that is obtained from the rotational speed of the rollers 3 of the chassis dynamometer 1, the accelerator opening degree that is detected by an accelerator opening degree sensor 6 provided in the vehicle 2, and the brake hydraulic pressure that is detected by a brake hydraulic pressure sensor 7 provided in the vehicle 2. Hereinafter, in the embodiment, the traveling speed, the accelerator opening degree, and the brake hydraulic pressure having been detected are respectively referred to as an actual traveling speed, an actual accelerator opening degree, and an actual brake hydraulic pressure.

In the embodiment, a display 5 that can be visually observed by the driver of the vehicle 2 is disposed in front of a front window of the vehicle 2. For example, a liquid crystal display can be used as the display 5. The display 5 is driven based on an output signal from the control device 4. The display 5 displays information included in the output signal. The display 5 is not necessarily disposed outside the vehicle 2, but can be carried into an inside of the vehicle 2 as a display of a personal computer, for example. Moreover, when a driving control device of the chassis dynamometer 1 is provided with a display, the display can also be used as the display. The display 5 is configured such that the driver of the vehicle 2 can visually observe information displayed on the display 5.

As described in JP-A-2015-64203, a time series change in a traveling speed that is set in advance and that is defined in each mode driving, that is, a time series image of target values (hereinafter, also referred to as target traveling speed) of the traveling speed and the detected actual traveling speeds is displayed on the display 5. Moreover, in the embodiment, together with the target traveling speeds and the actual traveling speeds, target values of the operation amount of an acceleration and deceleration operation member for attaining the target traveling speeds and detected actual values are also displayed as a time series image. The acceleration and deceleration operation member in this case is an accelerator pedal and a brake pedal, and target values of the operation amounts thereof are set as a target value of the accelerator opening degree and a target value of the brake hydraulic pressure. In the embodiment, the target value of the accelerator opening degree is also referred to a target accelerator opening degree, and the target value of the brake hydraulic pressure is also referred to as a target brake hydraulic pressure. Moreover, a target traveling speed that is defined in each mode driving has been stored in advance in a storage device of the control device 4.

When mode driving for fuel economy calculation, for example, is conducted in the vehicle 2 disposed on the chassis dynamometer 1, as described in the foregoing, traveling speeds of the vehicle 2 in time series are set in advance in each mode driving. A driving force for attaining the time series change in a traveling speed set in advance, that is, the target traveling speed is obtained from a traveling resistance provided from a side of the chassis dynamometer 1 and an acceleration in which a response delay from when the accelerator pedal is operated to when the traveling speed is accelerated, for example, is considered. Further, the target accelerator opening degree for attaining the necessary driving force can be calculated and set, for example, using an engine speed map in which the traveling speed and the accelerator opening degree are set as axes, and a torque map in which the engine speed and the accelerator opening degree are set as axes. Meanwhile, a braking force for attaining the target traveling speed is obtained from a traveling resistance provided from a side of the chassis dynamometer 1 and a deceleration in which a response delay from when the brake pedal is operated to when the traveling speed is decelerated, for example, is considered. Further, the target brake hydraulic pressure for attaining the necessary braking force can be calculated and set, for example, using an engine speed map in which the traveling speed and the accelerator opening degree (=0) are set as axes, a torque map (=engine brake torque) in which the engine speed and the accelerator opening degree are set as axes, and a relation between the brake hydraulic pressure and the braking torque.

In the embodiment, the target accelerator opening degrees and the target brake hydraulic pressures having been calculated and set as the above are stored in a storage in a time series manner. The controller displays the stored target accelerator opening degrees, the detected actual accelerator opening degrees, the stored target brake hydraulic pressures and the detected actual brake hydraulic pressures on the display 5 as a time series image, together with the target traveling speeds and the detected actual traveling speeds. A reference numeral 8 in FIG. 1 indicates a storage in the storage device, and a reference numeral 9 indicates the controller in the arithmetic processing device and the storage device. It is noted that these units constitute logical functions, which are described later, and are not present as specific components.

Figure 2:
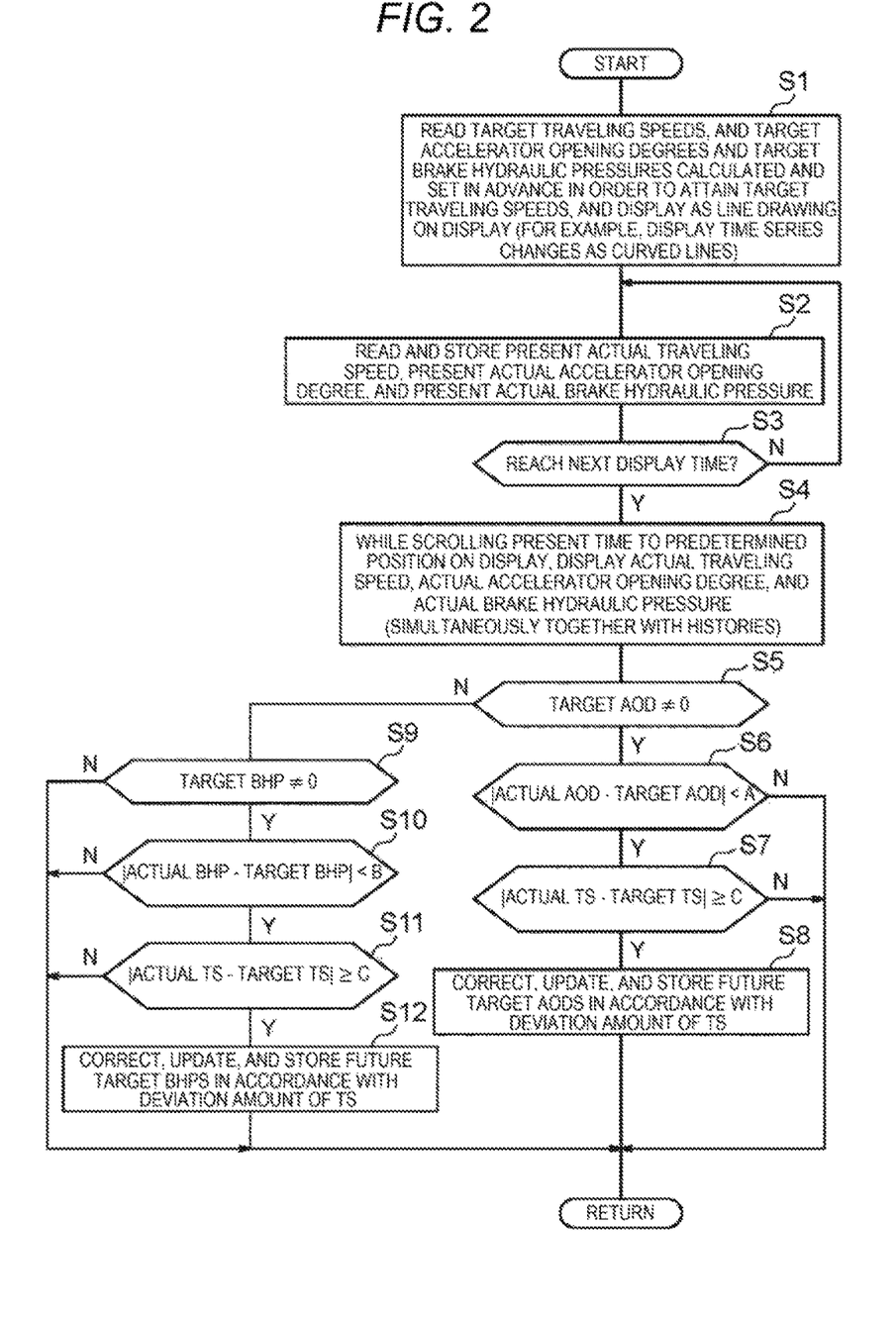
FIG. 2 is a flowchart of arithmetic processing performed by a control device in FIG. 1.

FIG. 2 is a flowchart of arithmetic processing performed by the control device 4. This arithmetic processing is started when mode driving of the vehicle 2 on the chassis dynamometer 1 is started, and is substantially executed for every display sampling period of an actual traveling speed, an actual accelerator opening degree, and an actual brake hydraulic pressure on the display 5. In this arithmetic processing, firstly, at a step S1, target traveling speeds stored in a storage device of the control device 4, and target accelerator opening degrees and target brake hydraulic pressures that are calculated and set in advance or updated by correction and stored as described later in order to attain the target traveling speeds are read, and are displayed on the display 5 as a time series image (line drawing). The time series image includes lines. In the display of each line drawing, for example, a temporal change in the target value, that is, a time series change is pattern-displayed as a curve of a line graph shape. The pattern-display may be conducted with the enumeration of dots, instead of the line. The pattern-display of the target value is displayed, for example, such that the center in the horizontal direction of the display 5 represents the present (present time) and the right direction represents the time in the future, and is scroll-displayed, with the elapse of time, for example, such that the center portion in the horizontal direction of the display 5 always represents the present.

The processing next proceeds to a step S2, and the present actual traveling speed detected from the rotational speed of the rollers 3 of the chassis dynamometer 1, the actual accelerator opening degree detected by the accelerator opening degree sensor 6, and the actual brake hydraulic pressure detected by the brake hydraulic pressure sensor 7 are read, and are stored in the storage device of the control device 4.

The processing next proceeds to a step S3, a determination is made as to whether the time has reached a next display time set in advance for displaying the actual traveling speed, the actual accelerator opening degree, and the actual brake hydraulic pressure on the display 5, the processing proceeds to a step S4 if the time has reached the next display time, whereas proceeds to the step S2 in the other case.

At the step S4, as described above, while the present time is scrolled to a predetermined position on the display 5, the actual traveling speed, the actual accelerator opening degree, and the actual brake hydraulic pressure are displayed on the display 5 with histories thereof, for example. In the embodiment, the actual traveling speed, the actual accelerator opening degree, and the actual brake hydraulic pressure are pattern-displayed so as to be overlapped with the target traveling speed, the target accelerator opening degree, and the target brake hydraulic pressure, respectively.

The processing next proceeds to a step S5, for example, a determination is made as to whether a target accelerator opening degree (AOD) at a future display time is not 0, and the processing proceeds to a step S6 if the target accelerator opening degree is not 0, whereas proceeds to a step S9 in the other case.

At the step 36, for example, a determination is made as to whether an absolute value of a difference value between the actual accelerator opening degree (AOD) at the future display time and the target accelerator opening degree (AOD) at the future display time is less than a predetermined value A set in advance, if the absolute value of the difference value between the accelerator opening degrees is less than the predetermined value A, that is, the actual value is within a predetermined range (A) relative to the target value of the accelerator opening degree, the processing proceeds to a step S7, whereas the processing is returned in the other case.

At the step S7, for example, a determination is made as to whether an absolute value of a difference value between the present actual traveling speed (TS) and the present target traveling speed (TS) is equal to or more than a predetermined value C set in advance, if the absolute value of the difference value is equal to or more than the predetermined value C, that is, the actual value is out of a predetermined range (C) relative to the target value of the traveling speed, the processing proceeds to a step S8, whereas the processing is returned in the other case.

At the step S8, for example, target accelerator opening degrees at future times from the present time are corrected in accordance with a difference value between the present actual traveling speed (TS) and the present target traveling speed (TS), that is, a deviation amount of the traveling speed (TS) that is generated in the vehicle 2, and the corrected target accelerator opening degrees (AOD) are updated and stored in the storage device (storage 8). Then, the processing is returned. The correction of the target accelerator opening degrees includes learning correction in which the target accelerator opening degrees are increased and decreased by each predetermined amount, in accordance with a direction and a magnitude of the deviation of the actual value relative to the target value of the traveling speed, for example.

On the other hand, at the step S9, for example, a determination is made as to whether a target brake hydraulic pressure (BHP) at the future display time is not 0, and the processing proceeds to a step 310 if the target brake hydraulic pressure is not 0, whereas the processing is returned in the other case.

At the step S10, for example, a determination is made as to whether an absolute value of a difference value between the actual brake hydraulic pressure (BHP) at the future display time and the target brake hydraulic pressure (BHP) at the future display time is less than a predetermined value B set in advance, if the absolute value of the difference value between the brake hydraulic pressures is less than the predetermined value B, that is, the actual value is within a predetermined range (B) relative to the target value of the brake hydraulic pressure, the processing proceeds to a step S11, whereas the processing is returned in the other case.

At the step S11, for example, a determination is made as to whether an absolute value of a difference value between the present actual traveling speed (TS) and the present target traveling speed (TS) is equal to or more than a predetermined value C set in advance, that is, the actual value is out of a predetermined range (C) relative to the target value of the traveling speed, the processing proceeds to a step S12, whereas the processing is returned in the other case.

At the step S12, for example, target brake hydraulic pressures (BHPs) at future times from the present time are corrected in accordance with a difference value between the present actual traveling speed (TS) and the present target traveling speed (TS), that is, a deviation amount of the traveling speed that is generated in the vehicle 2, and the corrected target brake hydraulic pressures are updated and stored in the storage device (storage 8). Then, the processing is returned. The correction of the target brake hydraulic pressures includes learning correction in which the target brake hydraulic pressures are increased and decreased by each predetermined amount, in accordance with a direction and a magnitude of the deviation of the actual value relative to the target value of the traveling speed, for example.

With the arithmetic processing, the target accelerator opening degrees and the target brake hydraulic pressures for attaining the target traveling speeds that are specified in the mode driving, fox example, are calculated and set in advance, are read from the storage device, and are pattern-displayed on the display 5 as the time series line drawing together with the target traveling speeds. The detected actual accelerator opening degrees and the detected actual brake hydraulic pressures are pattern-displayed on the display 5 as a time series image including dots or lines, together with the actual traveling speeds. Therefore, a driver who drives the vehicle 2 in the mode driving operates the accelerator pedal such that the actual accelerator opening degree agrees with the target accelerator opening degree, or the brake pedal such that the actual brake hydraulic pressure agrees with the target brake hydraulic pressure, for example.

As described in the foregoing, the target accelerator opening degrees and the target brake hydraulic pressures that are calculated and set in consideration of a response delay are displayed at a time earlier in time series than the traveling speeds that are results of the operation of the accelerator pedal or the brake pedal. Therefore, compared with a case where the driver simply operates the accelerator pedal or the brake pedal such that the actual traveling speed corresponds with the target traveling speed, the driver more easily causes the actual traveling speed to correspond with the target traveling speed by operating the accelerator pedal such that the actual accelerator opening degree agrees with the target accelerator opening degree or the brake pedal such that the actual brake hydraulic pressure agrees with the target brake hydraulic pressure, as a result. Moreover, as a result by causing the actual accelerator opening degree to agree with the target accelerator opening degree or causing the actual brake hydraulic pressure to agree with the target brake hydraulic pressure, if the actual traveling speed being corresponded to the target traveling speed is visually observed, even the driver with less experience can continue the mode driving with leeway.

In addition, similar to the target traveling speeds and the actual traveling speeds, the target accelerator opening degrees and the actual accelerator opening degrees, and the target brake hydraulic pressures and the actual brake hydraulic pressures are also pattern-displayed as a time series image including dots and lines. Accordingly, the driver easily sensuously recognizes themselves and the agreement and the correspondence between both, and more easily causes the actual traveling speed to agree with the target traveling speed. In addition, a case where the actual traveling speed is deviated from the target traveling speed regardless that the actual accelerator opening degree substantially agrees with the target accelerator opening degree or the actual brake hydraulic pressure substantially agrees with the target brake hydraulic pressure is considered to be resulting from an individual difference of the vehicle 2, for example, the target accelerator opening degree or the target brake hydraulic pressure is corrected in accordance with the deviation amount of the traveling speed. Therefore, even in such the vehicle 2, it is possible to conduct the mode driving by causing the actual traveling speed to correspond with the target traveling speed.

Conventionally, a driver has visually observed an image display of a traveling speed as a target, and has depressed an accelerator pedal such that the traveling speed corresponds with the traveling speed as a target. Accordingly, the driver is to have an experience and a skill to know the depression amount of the accelerator pedal for reaching the traveling speed. In contrast, when the depression amount of the accelerator pedal as a target value of an acceleration operation amount, for example, a target value of the accelerator opening degree is displayed as an image, the traveling speed as a target is attained simply by the driver depressing the accelerator pedal so as to agree with the accelerator opening degree.

Figure 3:
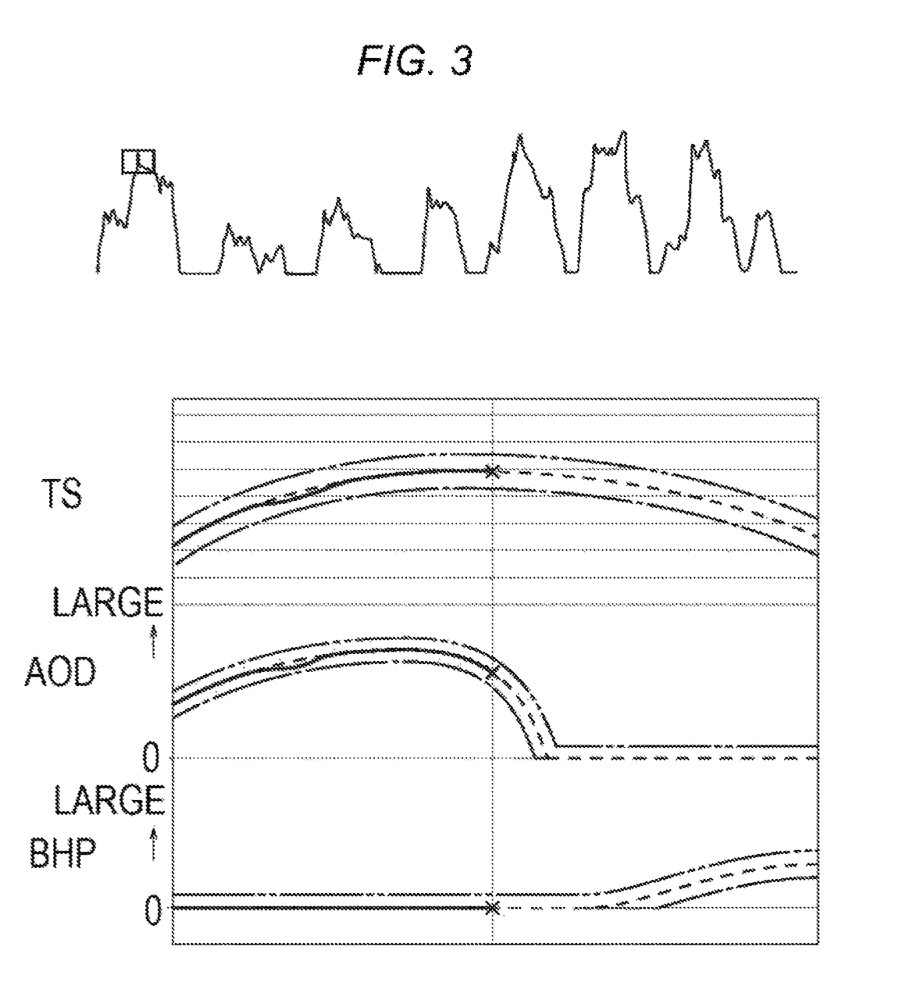
FIG. 3 is a diagram illustrating a screen displayed in the arithmetic processing in FIG. 2.

FIG. 3 illustrates one example of a display screen of the display 5 displayed based on the arithmetic processing. A time series change in the traveling speed from a start to an end of the mode driving, for example, is indicated at the topmost stage in the drawing. In this example, a portion of the time series change in the traveling sped surrounded as a rectangle is enlarged and displayed below. In the enlarged detailed display, from the upper portion, the traveling speed (TS), the accelerator opening degree (AOD), and the brake hydraulic pressure (BHP) are pattern-displayed in a time series manner as line drawings. In each of the line drawings, the broken line indicates a target value, and the solid line indicates an actual value. Moreover, the double chain line indicates each upper limit value, and the chain line indicates each lower limit value. For example, a difference value between the target traveling speed and the upper and lower limit values of the traveling speed is set as the predetermined value C, a difference value between the target accelerator opening degree and the upper and lower limit values of the accelerator opening degree is set as the predetermined value A, and a difference value between the target brake hydraulic pressure and the upper and lower limit values of the brake hydraulic pressure set as the predetermined value B. It is noted that the line drawing may be displayed using different colors in addition to or instead of the line types. Moreover, each of the traveling speed, the accelerator opening degree, and the brake hydraulic pressure being out of the upper and lower limit values does not hinder the driving itself of the vehicle 2.

In this example, the actual accelerator opening degree excellently agrees with the target accelerator opening degree, and as a result, the actual traveling speed excellently corresponds with the target traveling speed. For example, in this example, a period in which the actual accelerator opening degree excellently does not agree with the target accelerator opening degree, and as a result, the actual traveling speed does not correspond with the target traveling speed is present. The driver can recognize that the actual traveling speed corresponds with the target traveling speed by visually observing a relation between the operation amount of the accelerator opening degree and the traveling speed, and operating the accelerator pedal such that the actual accelerator opening degree agrees with the target accelerator opening degree, in an opposite manner. The opposite is equally true. The driver can recognize that the actual traveling speed corresponds with the target traveling speed because the actual accelerator opening degree agrees with the target accelerator opening degree. Therefore, it is easier for all the drivers to cause the actual accelerator opening degree to agree with the target accelerator opening degree than to cause the actual traveling speed that changes as a result of the operation of the accelerator pedal to correspond with the target traveling speed.

In this manner, in the mode driving assistance system for a vehicle in the embodiment, attaining the target accelerator opening degree and the target brake hydraulic pressure to be displayed on the display 5 allows the time series change in traveling speed that is set in advance to be attained. Accordingly, the accelerator pedal or the brake pedal is operated such that the actual accelerator opening degree and the actual brake hydraulic pressure agree with the target values to cause the traveling speed to be generally corresponded to the target value. The target accelerator opening degrees and the target brake hydraulic pressures are at the time earlier in time series than the traveling speeds that are results of the operation of the accelerator pedal or the brake pedal. The target accelerator opening degrees and the target brake hydraulic pressures, and the actual accelerator opening degrees and the actual brake hydraulic pressures are pattern-displayed as a time series image including dots and lines. Accordingly, as compared with a case where those are displayed as numerical values, even the driver with less experience of the mode driving easily causes the actual accelerator opening degree or the actual brake hydraulic pressure to visually agree with the target accelerator opening degree or the target brake hydraulic pressure. As a result, he or she easily causes the traveling speed to correspond with the time series change in the traveling speed that is set in advance.

Moreover, the target traveling speed and the actual traveling speed during the mode driving are displayed on the display 5 as an image with the target accelerator opening degree and the target brake hydraulic pressure, and the actual accelerator opening degree and the actual brake hydraulic pressure. Accordingly, the driver can visually observe the correspondence of the actual traveling speed with the target traveling speed as a result of the actual accelerator opening degree or the actual brake hydraulic pressure being caused to agree with the target accelerator opening degree or the target brake hydraulic pressure, so that even the driver with less experience about the mode driving more easily causes the traveling speed to correspond with the time series change in the traveling speed that is set in advance.

Moreover, it is considered that an individual difference of the vehicle 2 causes a case where the actual traveling speed does not correspond with the target traveling speed regardless that the actual accelerator opening degree or the actual brake hydraulic pressure is caused to substantially agree with the target accelerator opening degree or the target brake hydraulic pressure set in advance, for example. Accordingly, it is possible to cause the traveling speed to correspond with the time series change in the traveling speed that is set in advance by correcting the target accelerator opening degree or the target brake hydraulic pressure in accordance with the deviation amount, for example, a deviation direction and the magnitude such that the actual traveling speed corresponds with the target traveling speed.

Moreover, by setting the target value of the operation amount of the accelerator pedal to the target accelerator opening degree, even the driver with less experience about the mode driving easily causes the actual accelerator opening degree to agree with the target accelerator opening degree, and as a result, more easily causes the traveling speed to correspond with the time series change in the traveling speed that is set in advance.

Moreover, by setting the target value of the operation amount of the brake pedal to the target brake hydraulic pressure, even the driver with less experience about the mode driving easily causes the actual brake hydraulic pressure to agree with the target brake hydraulic pressure, and as a result, more easily causes the traveling speed to correspond with the time series change in the traveling speed that is set in advance.

The mode driving assistance system for a vehicle according to the embodiment has been described above. It is noted that the disclosure is not limited to the configurations described in the above embodiment. Various modifications may be made within the scope of the gist of the disclosure. For example, although the brake hydraulic pressure is used as the operation amount of the brake pedal in the embodiment, a brake pedal force including a depression force of the brake pedal can be used instead of the brake hydraulic pressure. For example, when a pedal stroke simulator is disposed in the brake system in an electric vehicle such as a hybrid vehicle that uses a brake-by-wire, the brake pedal force is used as the operation amount of the brake pedal.

Moreover, although both of the acceleration operation member including the accelerator pedal and the deceleration operation including the brake pedal are used as operation targets for causing the traveling speed to meet the target value in the mode driving in the embodiment, one of the operation members may be used, and a target value and an actual value thereof may be displayed on the display. However, as described in the foregoing, while it is difficult to cause the traveling speed of an unfamiliar vehicle to correspond with the target value using the operation amount of the accelerator pedal, for example, the driver sometimes wonders whether to depress the brake pedal when decelerating such a vehicle. Accordingly, it is most desired to display target values of actual values of both of the acceleration operation member and the deceleration operation member on the display.

As has been described in the foregoing, with the disclosure, even the driver with less experience easily causes the traveling speed of the vehicle to correspond with a time series change in a traveling speed that is defined in the mode driving. Accordingly, it is possible to always acquire fuel economy close to real fuel economy regardless of whether the driver has much experience about mode driving.

The invention claimed is:

1. A mode driving assistance system for a driver who operates a vehicle on a chassis dynamometer wherein the driver conducts mode driving by operating an operation member such that a traveling speed measured by the chassis dynamometer meets a target traveling speed set in advance that changes in a time series, the operation member being configured to conduct at least one of acceleration or deceleration of the vehicle, the mode driving assistance system comprising:
 a display unit;
 a storage configured to store a target value relating to an operation amount of the operation member in time series, the target value being set in advance in order to attain the time series change in the target traveling speed;
 a first detector configured to detect an actual value of the operation amount of the operation member; and
 a controller configured to display
  the target traveling speed,
  the traveling speed measured by the chassis dynamometer,
  the target value of the operation amount of the operation member stored in the storage and the actual value of the operation amount of the operation member detected by the first detector, as a time series image on the display unit, wherein the operation member is configured to decelerate the vehicle and comprises a brake pedal, the operation amount of the operation member is a brake hydraulic pressure in accordance with a depression amount of the brake pedal, and the target value is a brake hydraulic pressure configured to adjust the traveling speed measured by the chassis dynamometer to the target traveling speed by using a braking force calculated from a traveling resistance provided from the chassis dynamometer and a deceleration with a response delay from when the brake pedal is operated to when the traveling speed is decelerated.

2. The mode driving assistance system for a vehicle according to claim 1, further comprising:

a second detector configured to detect an actual value of the traveling speed of the vehicle, wherein the controller is configured to display (i) a target value of the traveling speed comprising the time series change in the traveling speed set in advance and (ii) the actual value of the traveling speed detected by the second detector as the time series image on the display.

3. The mode driving assistance system for a vehicle according to claim 1, wherein the controller comprises a correction unit configured to, when the actual value of the operation amount of the operation member is within a predetermined range that is set in advance to the target values of the operation amount of the operation member and the actual value of the traveling speed is out of a predetermined range that is set in advance relative to the target values of the traveling speed, correct the target value of the operation amount of the operation member in accordance with a deviation amount between the actual value of the traveling speed and the target value of the traveling speed.

4. A driving assistance system for a driver who operates a vehicle on a chassis dynamometer in mode driving that performs operations, including at least acceleration and deceleration, on the vehicle to follow a driving pattern including variation of traveling speed of the vehicle with time, the driving assistance system comprising:

a first sensor configured to detect operation amount of an acceleration pedal, of the vehicle, operated by a driver who operates the vehicle;

a second sensor configured to detect brake hydraulic pressure by operating a brake pedal operation of the driver;

a display unit; and a controller coupled with the first sensor, the second sensor and the display unit, and the controller configured to display, in time series on the display unit, the driving pattern, traveling speed measured by the chassis dynamometer, target operation amount, calculated in advance, of the acceleration pedal to follow the driving pattern, and operation amount of the acceleration pedal operated by the driver, the operation amount detected by the first sensor, and target brake hydraulic pressure, calculated in advance, to follow the driving pattern, and hydraulic pressure by operating a brake pedal operation of the driver, the hydraulic pressure detected by the second sensor, wherein the target operation amount is an accelerator opening degree configured to adjust the traveling speed measured by the chassis dynamometer to the driving pattern by using a driving force calculated from a traveling resistance provided from the chassis dynamometer and an acceleration with a response delay from when an accelerator pedal is operated to when the traveling speed is accelerated, and the target brake hydraulic pressure is a brake hydraulic pressure configured to adjust the traveling speed measured by the chassis dynamometer to a target traveling speed by using a braking force calculated from a traveling resistance provided from the chassis dynamometer, and a deceleration with a response delay from when the brake pedal is operated to when the traveling speed is decelerated.

5. The driving assistance system for the vehicle according to claim 4, wherein the controller is configured to adjust the target operation amount of the acceleration pedal on a basis of a difference between the operation amount and the target operation amount, when the traveling speed detected by the chassis dynamometer does not follow the driving pattern such that the operation amount of the acceleration pedal is caused to agree with the target operation amount of the acceleration pedal.

6. The driving assistance system for the vehicle according to claim 5, wherein the controller is configured to determine that the operation amount of the acceleration pedal agrees with the target operation amount of the acceleration pedal, when detecting that an absolute value of difference between the operation amount and the target operation amount is less than a first threshold.

7. The driving assistance system for the vehicle according to claim 4, wherein the controller is configured to adjust the target brake hydraulic pressure on a basis of a difference between the hydraulic pressure and the target brake hydraulic pressure, when the traveling speed detected by the chassis dynamometer does not follow the driving pattern such that the hydraulic pressure is caused to agree with the target brake hydraulic pressure.

8. The driving assistance system for the vehicle according to claim 7, wherein the controller is configured to determine that the hydraulic pressure agrees with the target brake hydraulic pressure, when detecting that an absolute value of difference between the hydraulic pressure and the target brake hydraulic pressure is less than a second threshold.

9. The driving assistance system according to claim 4, wherein the target brake hydraulic pressure is calculated using an engine speed map in which a traveling speed and an accelerator opening degree are set as axes, a torque map in which an engine speed and the accelerator opening degree are set as axes, and a relation between the brake hydraulic pressure and a braking torque.

10. The mode driving assistance system according to claim 4, wherein the target operation amount is calculated using an engine speed map in which a traveling speed and the accelerator opening degree are set as axes, and a torque map in which an engine speed and the accelerator opening degree are set as axes.

* * * * *